(12) United States Patent
Tanishima

(10) Patent No.: US 8,002,059 B2
(45) Date of Patent: Aug. 23, 2011

(54) CONTROLLING DEVICE AND METHOD FOR HYBRID VEHICLE

(75) Inventor: Kaori Tanishima, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1195 days.

(21) Appl. No.: 11/724,508

(22) Filed: Mar. 15, 2007

(65) Prior Publication Data

US 2007/0221421 A1    Sep. 27, 2007

(30) Foreign Application Priority Data

Mar. 23, 2006    (JP) ................................. 2006-080600

(51) Int. Cl.
*B60W 20/00* (2006.01)
(52) U.S. Cl. ............ 180/65.275; 180/65.28; 180/65.265
(58) Field of Classification Search ............... 180/65.21, 180/65.265, 65.28, 65.285, 65.275
See application file for complete search history.

(56) References Cited

U.S. PATENT DOCUMENTS

| | | | | |
|---|---|---|---|---|
| 3,888,325 A * | 6/1975 | Reinbeck | ................... | 180/65.25 |
| 4,499,965 A * | 2/1985 | Oetting et al. | ................ | 180/165 |
| 5,909,094 A * | 6/1999 | Yamada et al. | ............... | 318/140 |
| 6,018,198 A * | 1/2000 | Tsuzuki et al. | ................. | 290/17 |
| 6,287,081 B1 * | 9/2001 | Tamegai et al. | ................. | 417/15 |
| 6,359,345 B1 * | 3/2002 | Suzuki | ........................ | 290/40 C |
| 6,752,741 B2 * | 6/2004 | Kahlon et al. | .................... | 477/5 |
| 6,832,148 B1 * | 12/2004 | Bennett et al. | .................. | 701/54 |
| 6,877,575 B2 * | 4/2005 | McCarthy | ................ | 180/65.235 |
| 7,163,480 B2 * | 1/2007 | Supina et al. | ..................... | 475/5 |
| 2001/0011050 A1 * | 8/2001 | Yamaguchi et al. | .............. | 477/3 |
| 2002/0014872 A1 * | 2/2002 | Morimoto et al. | ............ | 318/445 |
| 2002/0017406 A1 * | 2/2002 | Hisada | .......... | 180/65.2 |
| 2002/0049115 A1 * | 4/2002 | Suzuki | .............. | 477/3 |
| 2002/0195285 A1 * | 12/2002 | Egami | .......... | 180/53.8 |
| 2003/0004031 A1 * | 1/2003 | Philips et al. | ..................... | 477/5 |
| 2003/0224902 A1 * | 12/2003 | Kahlon et al. | .................... | 477/3 |
| 2004/0127327 A1 * | 7/2004 | Kahlon et al. | .................... | 477/5 |
| 2004/0176203 A1 * | 9/2004 | Supina et al. | ..................... | 475/8 |
| 2005/0256631 A1 * | 11/2005 | Cawthorne et al. | ............ | 701/99 |

(Continued)

FOREIGN PATENT DOCUMENTS

JP    11-082260    3/1999

(Continued)

*Primary Examiner* — Hau Phan
*Assistant Examiner* — Travis Coolman
(74) *Attorney, Agent, or Firm* — Young Basile

(57) ABSTRACT

A mode switching controlling device and method switches a hybrid drive (HEV) mode to an electric drive (EV) mode without engine stoppage shock. A fourth-to-fifth speed upshifting command is generated due to reduction in an accelerator opening. Then, an HEV-to-EV-mode switching command is generated. A command pressure of a direct clutch is set to 0, and an actual-pressure reduction disengages the direct clutch, causing an automatic transmission to be in a neutral state. When a first time elapses from generation of the switching command, a first clutch command pressure is set to its maximum value, and the first clutch disengages by an actual pressure increase. When a second time elapses, the engine is stopped by reducing engine torque to perform mode switching. A front brake command pressure is set to a precharge pressure when the second time elapses and to its maximum value at a later time when a gear-switching rotation matching controlling operation of a motor-generator is ended, so that the front brake is engaged due to an actual pressure increase for upshifting from the fourth to fifth speed.

16 Claims, 8 Drawing Sheets

U.S. PATENT DOCUMENTS

| | | |
|---|---|---|
| 2006/0040791 A1* | 2/2006 | Nakajima et al. ............. 477/111 |
| 2006/0194670 A1* | 8/2006 | Heap et al. ......................... 477/3 |
| 2006/0259223 A1* | 11/2006 | Schiele et al. ................... 701/51 |
| 2007/0078580 A1* | 4/2007 | Cawthorne et al. ............. 701/51 |
| 2007/0095584 A1* | 5/2007 | Roske et al. ................. 180/65.2 |
| 2008/0182722 A1* | 7/2008 | Colvin et al. ................. 477/180 |

FOREIGN PATENT DOCUMENTS

| | | |
|---|---|---|
| JP | 2001-032922 A | 2/2001 |

* cited by examiner

FIG. 5

| TRANSMISSION FRICTION ELEMENT / GEAR | I/C | H&LR/C | D/C | R/B | Fr/B | LC/B | FWD/B | 1st /OWC | 3rd /OWC | FWD /OWC |
|---|---|---|---|---|---|---|---|---|---|---|
| FIRST SPEED |  | ● |  |  | ● | ● | ○ | ○ | ○ | ○ |
| SECOND SPEED |  | ○ | ○ |  | ● | ● | ○ |  | ○ | ○ |
| THIRD SPEED | ○ | ○ | ○ |  | ● |  | ○ |  | ○ |  |
| FOURTH SPEED | ○ | ○ | ○→ |  |  |  | ○ |  |  |  |
| FIFTH SPEED |  | ○ |  |  | →○ |  | ○ |  |  |  |
| RETREAT |  | ● |  | ○ | ● |  |  | ○ | ○ |  |

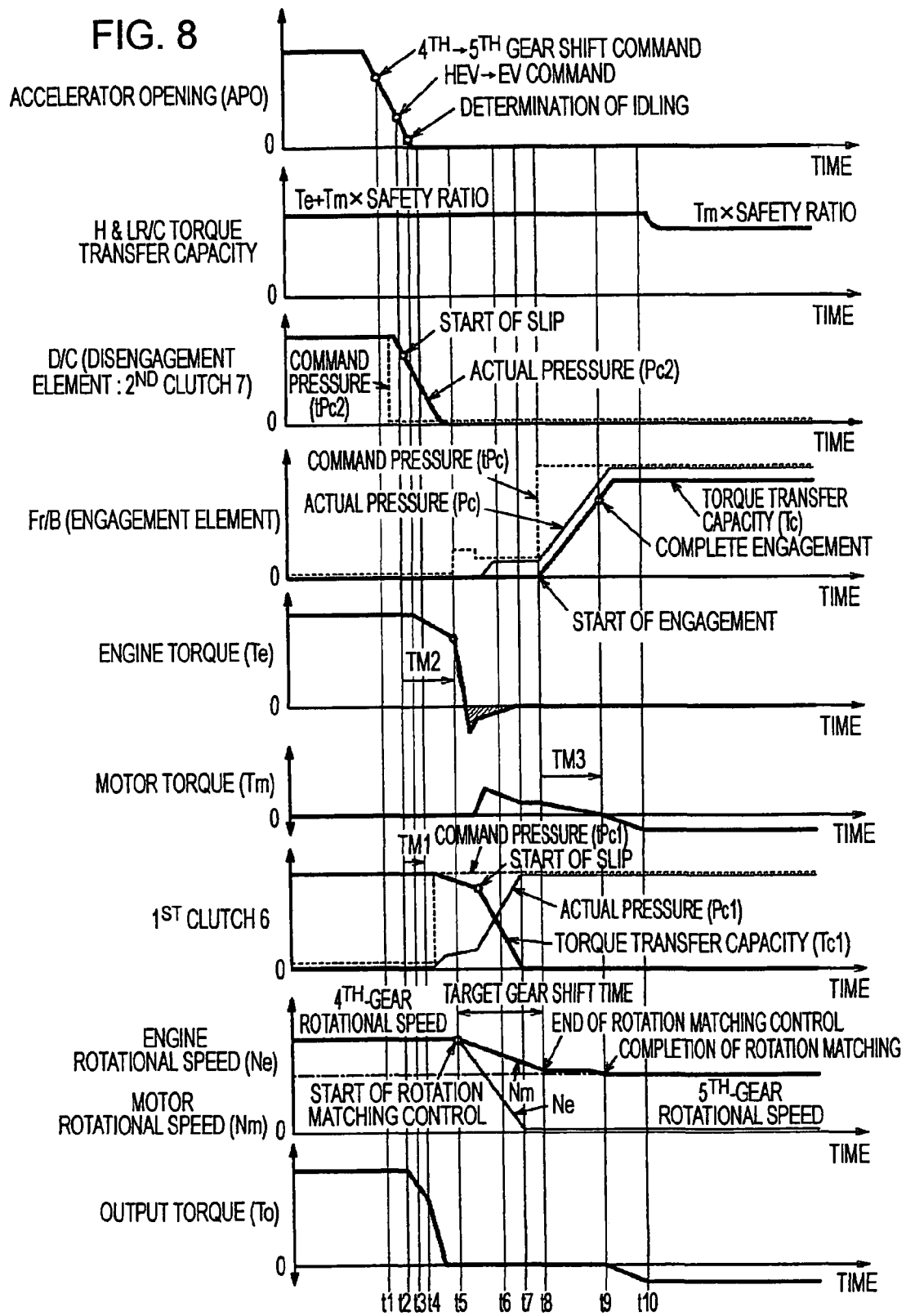

CONTROLLING DEVICE AND METHOD FOR HYBRID VEHICLE

CROSS-REFERENCE TO RELATED APPLICATION

This application claims priority from Japanese Patent Application Serial No. 2006-080600, filed Mar. 23, 2006, which is incorporated herein in its entirety by reference.

FIELD OF THE INVENTION

The present invention relates to a hybrid vehicle capable of traveling by power from a motor-generator in addition to that from an engine.

BACKGROUND

Hybrid vehicles have an electric drive (EV) mode, in which the hybrid vehicle travels only by power from the motor-generator, and a hybrid drive (HEV) mode, in which the hybrid vehicle can travel by power from both the engine and the motor-generator. Hitherto, various types of hybrid driving devices used in hybrid vehicles like the one described above have been proposed.

One type such as that described in Japanese Unexamined Patent Application Publication No. 11-082260 among the various types is known. The hybrid driving device disclosed in that document includes a motor-generator provided between an engine and a transmission as a result of connecting an output shaft of the engine and an input shaft of the transmission. A first clutch that connects the engine and the motor-generator so that they can be separated from each other, and a second clutch that connects an output shaft of the transmission and the motor/generator so that they can be separated from each other.

When the first clutch is disengaged, and the second clutch is engaged, the hybrid vehicle including the hybrid driving device is put in the electric drive (EV) mode, in which the hybrid vehicle travels only by power from the motor-generator. When the first and second clutches are both engaged, the hybrid vehicle including the hybrid driving device is put in the hybrid drive (HEV) mode, in which the hybrid vehicle can travel by power from both the engine and the motor-generator.

In the hybrid vehicle, when engine output becomes unnecessary because it has become possible to generate a required driving force only by the motor-generator as a result of a reduction in the required driving force. Such a reduction is caused by, for example, a driver taking is his/her foot off a depressed accelerator pedal when the hybrid vehicle is traveling in the HEV mode. Then, the HEV mode is switched to the EV mode.

According to this known device, it is necessary to perform the mode switching while disengaging the first clutch and stopping the engine. In addition, it is necessary to perform driving force proportion switching so that a state in which the required driving force is generated by the engine and the motor-generator is switched to a state in which the required driving force is generated by only the motor-generator.

BRIEF SUMMARY

Embodiments of a controlling device and method for a hybrid vehicle are taught herein. One embodiment of such a controlling device comprises an engine, a motor-generator, a first clutch whose torque transfer capacity is changeable between the engine and the motor-generator, a second clutch whose torque transfer capacity is changeable between the motor-generator and a driving wheel and a controller. The controller is configured to control a selection between an electric drive mode, in which the hybrid vehicle travels by using the motor-generator while the first clutch is disengaged and the second clutch is engaged, and a hybrid drive mode, in which the hybrid vehicle travels by at least driving force of the engine while the first clutch and the second clutch are engaged. The controller is also configured to perform mode switching from the hybrid drive mode to the electric drive mode by reducing the torque transfer capacity of the second clutch, then initiating a stop of the engine, and then disengaging the first clutch responsive to reducing the torque transfer capacity of the second clutch.

Another embodiment of such a device comprises an engine, a motor-generator, first means for changing a torque transfer capacity between the engine and the motor-generator and second means for changing a torque transfer capacity between the motor-generator and a driving wheel. The device also includes means for controlling a selection between an electric drive mode, in which the hybrid vehicle travels by using the motor-generator while the first changing means is disengaged and the second changing means is engaged, and a hybrid drive mode, in which the hybrid vehicle travels by at least driving force of the engine when the first changing means and the second changing means are engaged. Finally, the device of this embodiment includes means for performing mode switching from the hybrid drive mode to the electric drive mode by reducing the torque transfer capacity of the second changing means, then initiating a stop of the engine, and then disengaging the first changing means responsive to reducing the torque transfer capacity of the second changing means.

Examples of methods for controlling a hybrid vehicle are taught herein. The hybrid vehicle includes an engine, a motor-generator, a first clutch with a torque transfer capacity changeable between the engine and the motor-generator and a second clutch with a torque transfer capacity changeable between the motor-generator and a driving wheel. The method comprises controlling a selection between an electric drive mode, in which the hybrid vehicle travels by using the motor-generator while the first clutch is disengaged and the second clutch is engaged, and a hybrid drive mode, in which the hybrid vehicle travels by at least driving force of the engine while the first clutch and the second clutch are engaged, and performing mode switching from the hybrid drive mode to the electric drive mode by reducing the torque transfer capacity of the second clutch, then initiating a stop of the engine, and by then disengaging the first clutch responsive to reducing the torque transfer capacity of the second clutch.

BRIEF DESCRIPTION OF THE DRAWINGS

The description herein makes reference to the accompanying drawings wherein like reference numerals refer to like parts throughout the several views, and wherein:

FIG. 5 is an engagement logic diagram showing relationships between combinations of engagements of transmission friction elements in the automatic transmission shown in FIG. 4 and selected gears of the automatic transmission;

FIG. 8 is an operation time chart of an HEV-to-EV-mode switching controlling operation that is executed by the integrated controller in the controlling system shown in FIG. 6.

DETAILED DESCRIPTION OF EMBODIMENTS OF THE INVENTION

Figure 1:
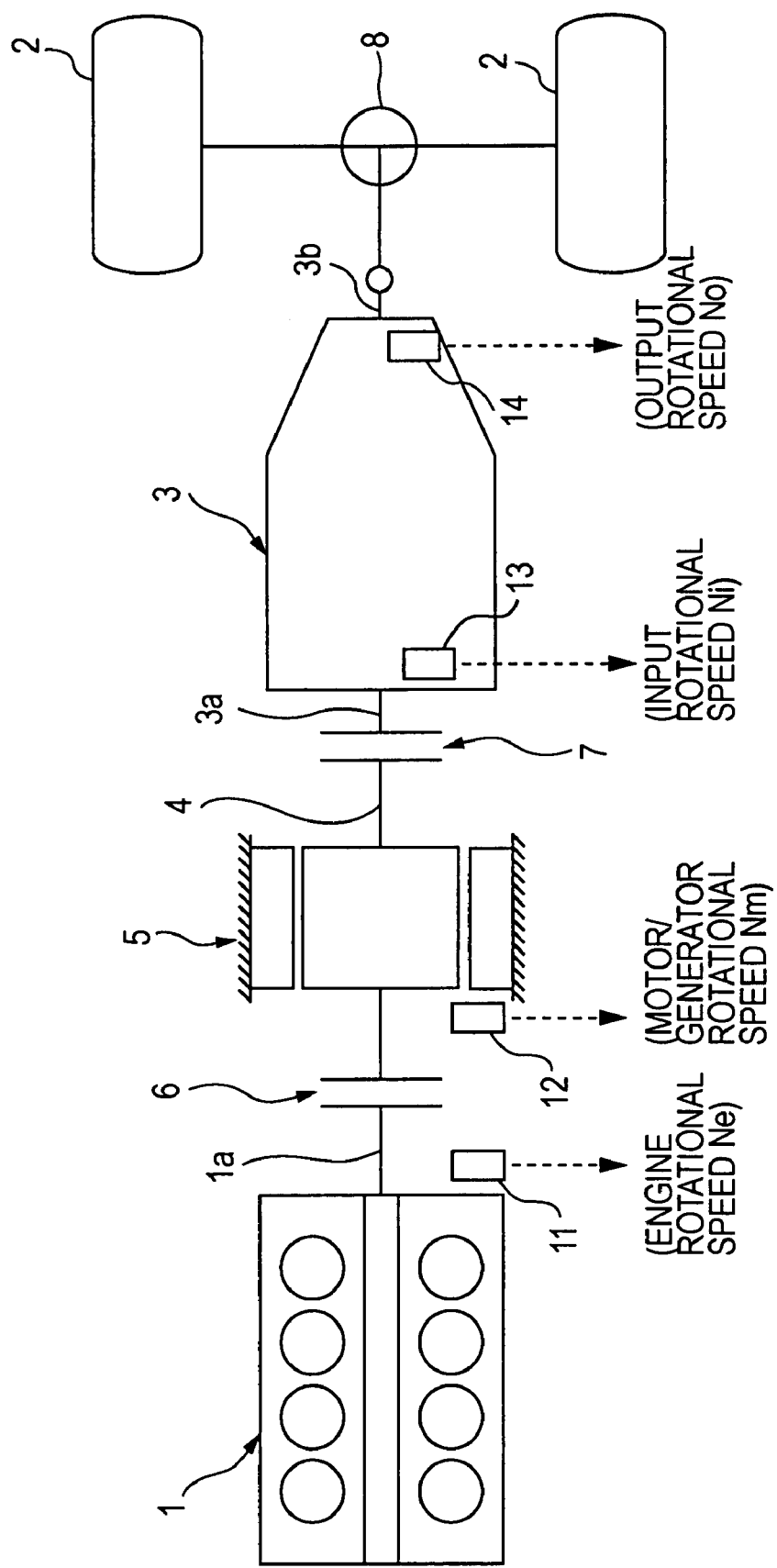
FIG. 1 is a schematic plan view of a power train of a hybrid vehicle in which an embodiment of the invention can be incorporated.

A suitable related technology for disengaging the first clutch, stopping the engine and switching the driving force proportions, which need to be carried out when performing the mode switching, so that the mode switching is smoothly performed without any shock has not been proposed in any documents including Japanese Unexamined Patent Application Publication No. 11-082260.

Because of shock in existing mode switching, it becomes difficult to control a timing of disengaging the first clutch, to control a timing of stopping the engine and to control the motor-generator for switching the driving force proportions when mode switching from the HEV mode to the EV mode. In addition, since it is necessary to perform rotation matching control of the motor-generator in preventing gear-shifting shock when the mode switching involves gear shifting of an automatic transmission, it is even more difficult to solve the problems.

More specifically, among the disengaging of the first clutch and the stopping of the engine that need to be performed when switching from the HEV mode to the EV mode, the disengaging of the first clutch is such that its disengagement timing varies due to, for example, deterioration with time and temperature change of clutch operating fluid. The stopping of the engine is such that its engine stoppage timing varies due to frictional change caused by, for example, wearing with time and temperature change.

As a result, when the engine is stopped by, for example, a fuel cut (fuel supply stoppage) while a torque transfer capacity of the first clutch is greater than an engine torque due to the disengagement timing of the first clutch being slower than the stoppage timing of the engine, torque variation occurring when the engine is stopped is transmitted to rear driving wheels through the first clutch. This causes an engine stoppage shock to occur.

The engine stoppage shock is particularly felt by the driver due to engine braking being small immediately after upshifting (shifting to a high speed gear) of the automatic transmission resulting from a reduction in an amount of depression of the accelerator pedal while the automatic transmission is selecting a relatively low-speed gear.

In contrast to existing mode switching, embodiments of the invention provide a mode switching controlling device and method for a hybrid vehicle that reduce engine stoppage shock caused by mode switching. Embodiments taught herein set, during the mode switching, a second clutch in a reduced torque transfer capacity state that allows the engine stoppage shock to be absorbed.

More particularly, embodiments of the invention relate to a mode switching controlling device and method for smoothly stopping the engine without shock, wherein the engine stoppage is required when engine output becomes unnecessary during traveling in the HEV mode. Then, the HEV mode is switched to the EV mode.

According to teachings herein, the hybrid vehicle includes an engine and a motor-generator, which serve as power sources. A first clutch is disposed between the engine and the motor-generator and has a changeable torque transfer capacity. A second clutch is disposed between the motor-generator and a driving wheel and has a changeable torque transfer capacity. In the hybrid vehicle, an electric drive mode in which the hybrid vehicle travels only by power from the motor-generator as a result of disengaging the first clutch and engaging the second clutch is selectable. In addition, a hybrid drive mode in which the hybrid vehicle travels by power from both the engine and the motor-generator as a result of engaging both the first and second clutches is selectable.

In the hybrid vehicle, when performing mode switching to the electric drive mode from the hybrid drive mode as a result of stopping the engine and disengaging the first clutch, the engine is stopped and the first clutch is disengaged while a torque transfer capacity of the second clutch is reduced so that the second clutch can absorb shock that is produced when stopping the engine. Therefore, even if the engine is stopped while a torque transfer capacity of the first clutch is greater than an engine torque due to a disengagement timing of the first clutch being slower than a stoppage timing of the engine, torque variation occurring when stopping the engine is absorbed by a slip of the second clutch that is disposed in a path through which the torque variation is transmitted towards rear driving wheels through the first clutch. Consequently, it is possible to prevent the production of engine stoppage shock.

Embodiments of the invention are described in detail herein with reference to the drawings.

FIG. 1 shows a power train of a front-engine/rear-wheel-drive hybrid vehicle including a hybrid driving device in which a mode switching controlling device and method according to the present invention can be incorporated. Shown are an engine 1 and driving wheels 2 (rear wheels here, by example).

In the power train of the hybrid vehicle shown in FIG. 1, as with an ordinary rear wheel driving pulley, an automatic transmission 3 is disposed in tandem behind the engine 1 in a front-back direction of the vehicle. In addition, a motor-generator 5 is disposed between the engine 1 (e.g., crank shaft 1a) and the automatic transmission 3.

The motor-generator 5 operates as a motor and a generator.

A first clutch 6 is inserted between the motor-generator 5 and the engine 1, more specifically, between a shaft 4 and the engine crank shaft 1a. The engine 1 and the motor-generator 5 are connected by the first clutch 6 so that they can be separated from each other.

Here, torque transfer capacity of the first clutch 6 can be changed continuously or in steps. The first clutch 6 is, for example, a multi-plate wet clutch whose torque transfer capacity is changeable by continuously controlling clutch operating fluid flow amount and clutch operating fluid pressure by a proportional solenoid.

A second clutch 7 is inserted between the motor-generator 5 and the automatic transmission 3, more specifically, between the shaft 4 and a transmission input shaft 3a. The motor-generator 5 and the automatic transmission 3 are connected by the second clutch 7 so that they can be separated from each other.

Like the first clutch 6, torque transfer capacity of the second clutch 7 is changeable continuously or in steps. The second clutch 7 is, for example, a multi-plate wet clutch whose torque transfer capacity is changeable by continuously controlling clutch operating fluid flow amount and clutch operating fluid pressure by a proportional solenoid.

The automatic transmission 3 can be the same as the one described from pages C-9 to C-22 in "Description of Skyline New Model Car (CV35)" issued by Nissan Motor Co., Ltd., in January, 2003. A transmission path (shift gear) is determined by selectively engaging and disengaging a plurality of transmission friction elements (such as clutches and brakes) and combining the engagements and disengagements of the transmission friction elements. Therefore, the automatic transmission 3 changes the speed of rotation from the input shaft 3a at a gear ratio in accordance with the selected gear and outputs the resulting rotation to an output shaft 3b. The output rotation is distributed and transmitted to the left and right rear wheels 2 by a differential gear unit 8 to cause the vehicle to travel.

Of course, the automatic transmission 3 may be a continuous variable transmission (CVT) in addition to the described stage transmission.

Figure 4:
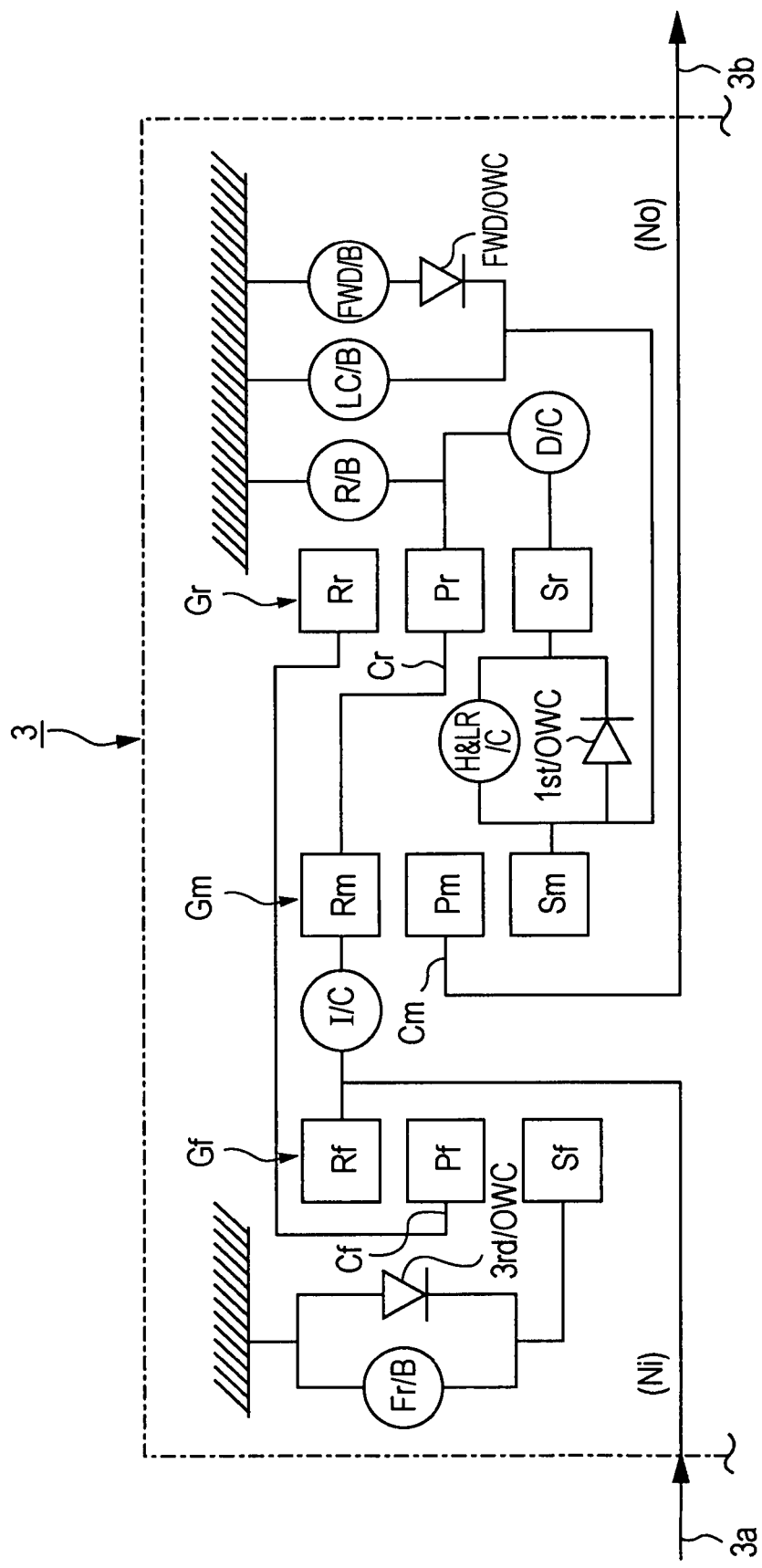
FIG. 4 is a general view of an automatic transmission in any of the power train configurations shown in FIGS. 1 to 3.

The automatic transmission 3 is shown in FIG. 4 and will schematically be described below.

The input shaft 3a and the output shaft 3b are disposed so as to be coaxially abutted against each other. From the engine 1 (motor-generator 5) side, a front planetary gear group Gf, a center planetary gear group Gm and a rear planetary gear group Gr are disposed in that order above the input shaft 3a and the output shaft 3b, and these are main structural elements of a planetary gear transmission mechanism in the automatic transmission 3.

The front planetary gear group Gf that is closest to the engine 1 is a simple planetary gear group including a front sun gear Sf, a front ring gear Rf, a front pinion gear Pf that engages these gears Sf and Rf, and a front carrier Cf that rotatably supports the front pinion Pf.

The center planetary gear group Gm that is the next closest gear group to the engine 1 is a simple planetary gear group including a center sun gear Sm, a center ring gear Rm, a center pinion Pm that engages these gears Sm and Rm, and a center carrier Cm that rotatably supports the center pinion Pm.

The rear planetary gear group Gr that is furthest from the engine 1 is a simple planetary gear group including a rear sun gear Sr, a rear ring gear Rr, a rear pinion Pr that engages these gears Sr and Rr, and a rear carrier Cr that rotatably supports the rear pinion Pr.

A front brake Fr/B, an input clutch I/C, a high-and-low reverse clutch H&LR/C, a direct clutch D/C, a reverse brake R/B, a low-cost brake LC/B and a forward brake FWD/B are provided as the transmission friction elements that determine a transmission path (shift gear) of the planetary gear transmission mechanism. These transmission friction elements along with three one-way clutches (that is, a third-speed one-way clutch 3rd/OWC, a first-speed one-way clutch 1st/OWC and a forward one-way clutch FWD/OWC) are brought into mutual relationship with the planetary gear groups Gf, Gm, and Gr as described below to form the planetary gear transmission mechanism of the automatic transmission 3.

The front ring gear Rf is connected to the input shaft 3a, and the center ring gear Rm can be connected to the input shaft 3a as required by the input clutch I/C.

The front sun gear Sf is prevented from rotating in a direction that is opposite to a direction of rotation of the engine 1 through the third-speed one-way clutch 3rd/OWC and can be fixed as appropriate by the front brake Fr/B that is disposed parallel to the third-speed one-way clutch 3rd/OWC.

The front carrier Cf is connected to the rear ring gear Rr, and the center ring gear Rm is connected to the rear carrier Cr.

The center carrier Cm is connected to the output shaft 3b. With regard to the center sun gear Sm and the rear sun gear Sr, the center sun gear Sm is prevented from rotating in a direction opposite to the direction of rotation of the engine 1 with respect to the rear sun gear Sr through the first-speed one-way clutch 1st/OWC, and the center sun gear Sm and the rear sun gear Sr can be connected to each other by the high-and-low reverse clutch H&LR/C.

The rear sun gear Sr and the rear carrier Cr can be connected to each other by the direct clutch D/C, and the rear carrier Cr can be fixed as appropriate by the reverse brake R/B.

The center sun gear Sm is further prevented from rotating in a direction opposite to the direction of rotation of the engine 1, when the forward brake FWD/B is engaged, by the forward brake FWD/B and the forward one-way clutch FWD/OWC. In addition, the center sun gear Sm can be fixed as appropriate by the low-cost brake LC/B. Accordingly, the low-cost brake LC/B is provided in parallel with the forward brake FWD/B and the forward one-way clutch FWD/OWC.

A power transmission train of the planetary gear transmission mechanism can provide forward gears (that is, a forward first speed (1st gear), a forward second speed (2nd gear), a forward third speed (3rd gear), a forward fourth speed (4th gear) and a forward fifth speed (5th gear)) and a reverse shift gear (Rev) as a result of selective engagements. The selective engagements of the seven transmission friction elements Fr/B, I/C, H&LR/C, R/B, LC/B and FWD/B, and the three one-way clutches 3rd/OWC, 1st/OWC and FWD/OWC, are indicated by white circles and black circles (when engine braking) as shown in FIG. 5.

As shown in FIG. 5, the white, or clear, circles mean that the friction (or engagement) element (e.g., I/C or H&LR/C) is always engaged at that speed ratio. For example, H&LR/C at third speed gear ratio is a clear circle, which means that whether the vehicle is accelerating or coasting, the H&LR/C clutch is engaged at the third speed gear ratio. In contrast, the friction element Fr/B at the third speed gear ratio is a black circle. This means that the friction element, brake Fr/B, engages only when the vehicle is accelerating (the brake Fr/B disengages when the vehicle is coasting with the engine brake.)

In the power train shown in FIG. 1, which includes the above-described automatic transmission 3, when an electric drive (EV) mode is required, the first clutch 6 is disengaged, the second clutch 7 is engaged, and the automatic transmission 3 is set in a power transmission state. The EV mode is used during a low-load or a low-speed state such as when starting a stopped vehicle.

When the motor-generator 5 is driven in this state, only output rotation from the motor-generator 5 is transmitted to the transmission input shaft 3a. The automatic transmission 3 changes the speed of the rotation towards the input shaft 3a in accordance with a selected gear and outputs this rotation from the transmission output shaft 3b.

Thereafter, the rotation from the transmission output shaft 3b reaches the rear wheels 2 through the differential gear unit 8, so that the vehicle can be subjected to electric driving (EV driving) by only the motor-generator 5.

When a hybrid drive (HEV drive) mode is required, the first clutch 6 and the second clutch 7 are engaged, and the automatic transmission 3 is set in a power transmission state. The HEV mode is used when traveling at a high speed, when traveling under a high load, when the remaining amount of battery capacity is small, etc.

In this state, output rotation from the engine, or the output rotation from the engine 1 and output rotation from the motor-generator 5, reach the transmission input shaft 3a so that the automatic transmission 3 changes the speed of the rotation towards the input shaft 3a in accordance with a selected gear and outputs this rotation from the transmission output shaft 3b.

Thereafter, the rotation from the transmission output shaft 3b reaches the rear wheels 2 through the differential gear unit 8 so that the vehicle can be subjected to hybrid driving (HEV driving) by both the engine 1 and the motor-generator 5.

In the HEV driving, when there is excess energy when the engine 1 is operated at optimum fuel consumption, this excess energy is used to operate the motor-generator 5 as a generator so that the excess energy is converted into electrical power. By storing the generated power so as to be used for motor driving of the motor-generator 5, it is possible to improve the fuel consumption of the engine 1.

Figure 2:
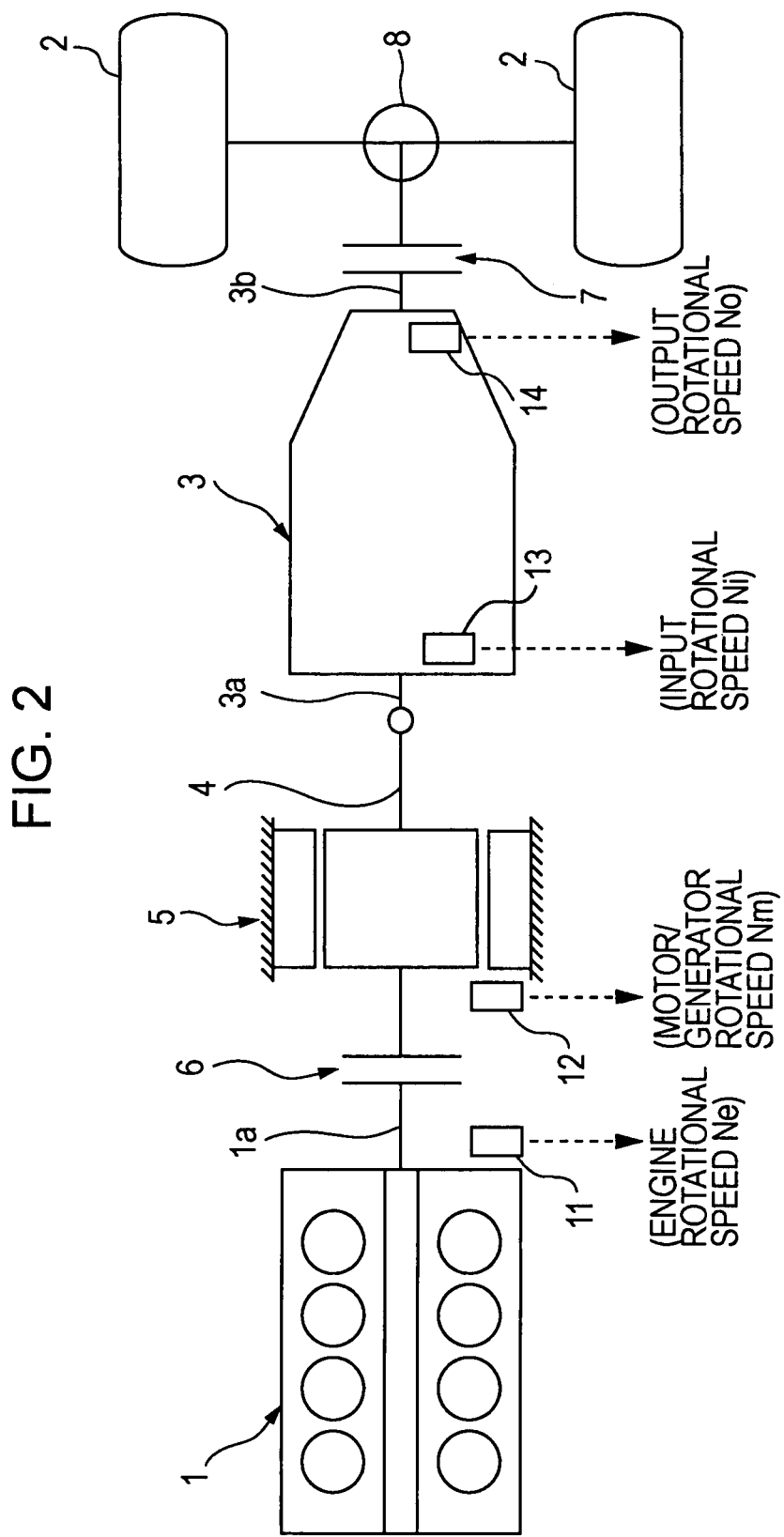
FIG. 2 is a schematic plan view of another power train of the hybrid vehicle in which an embodiment of the invention can be incorporated.

Although in FIG. 1 the second clutch 7 that connects the motor-generator 5 and the driving wheels 2 so that they can be separated from each other is interposed between the motor-generator 5 and the automatic transmission 3, the second clutch 7 may be disposed between the automatic transmission 3 and the differential gear unit 8 as shown in FIG. 2 so as to similarly operate the second clutch 7.

In FIGS. 1 and 2, the second clutch 7 is added as a dedicated clutch in front of and behind the automatic transmission 3, respectively. However, the second clutch 7 may be a clutch used as a transmission friction element, which already exists in the automatic transmission 3, for selecting a forward gear or for selecting a reverse gear.

A transmission friction element of the automatic transmission 3 that is used as the second clutch 7 is described below.

In this case, in addition to performing the above-mentioned mode selection function, the second clutch 7 sets the automatic transmission in a power transmission state when it is engaged to achieve the function. Therefore, the structure shown in FIG. 3 is highly advantageous from the viewpoint of costs because a dedicated second clutch is not used.

Figure 3:
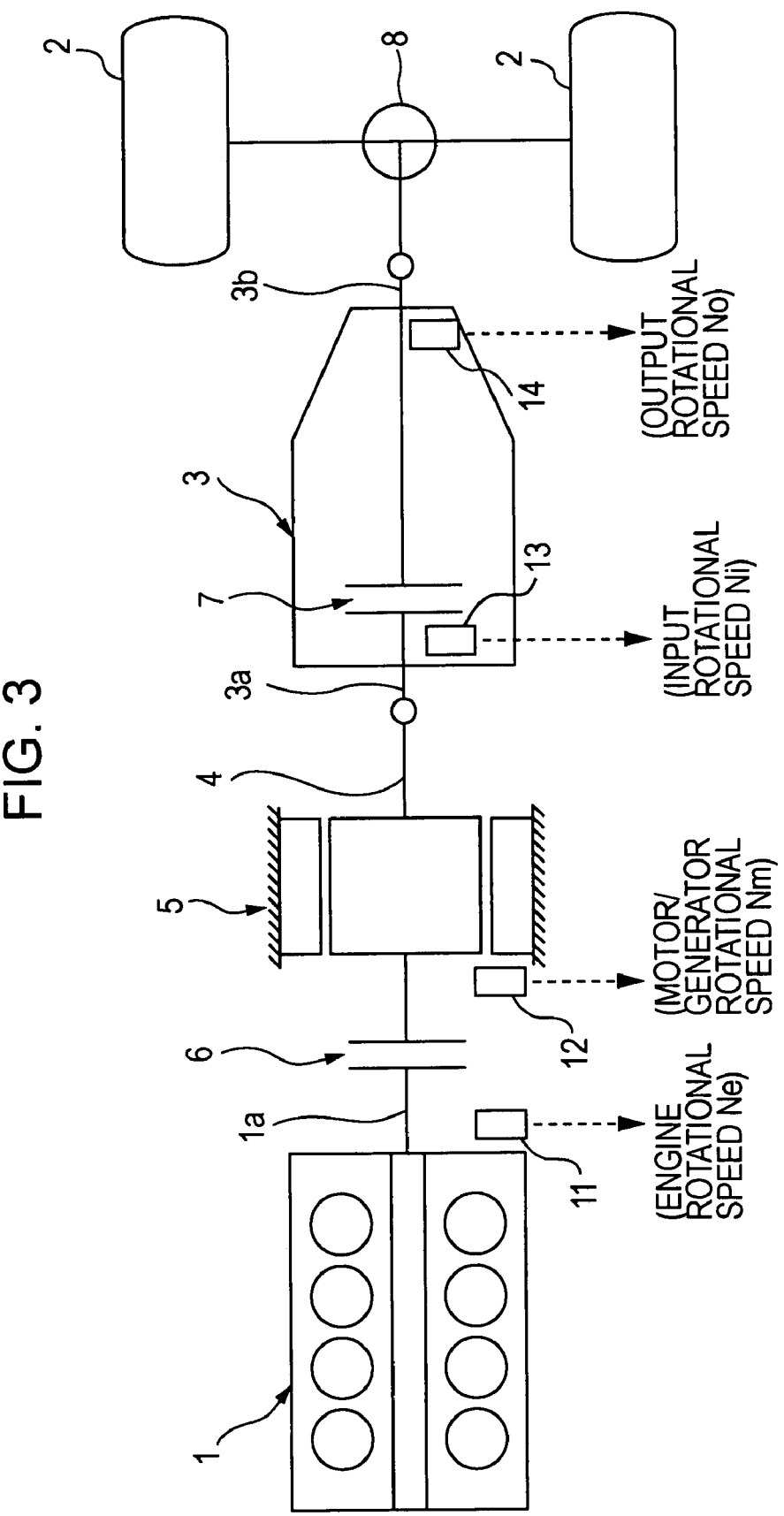
FIG. 3 is a schematic plan view of still another power train of the hybrid vehicle in which an embodiment according to the invention can be incorporated.
Figure 6:
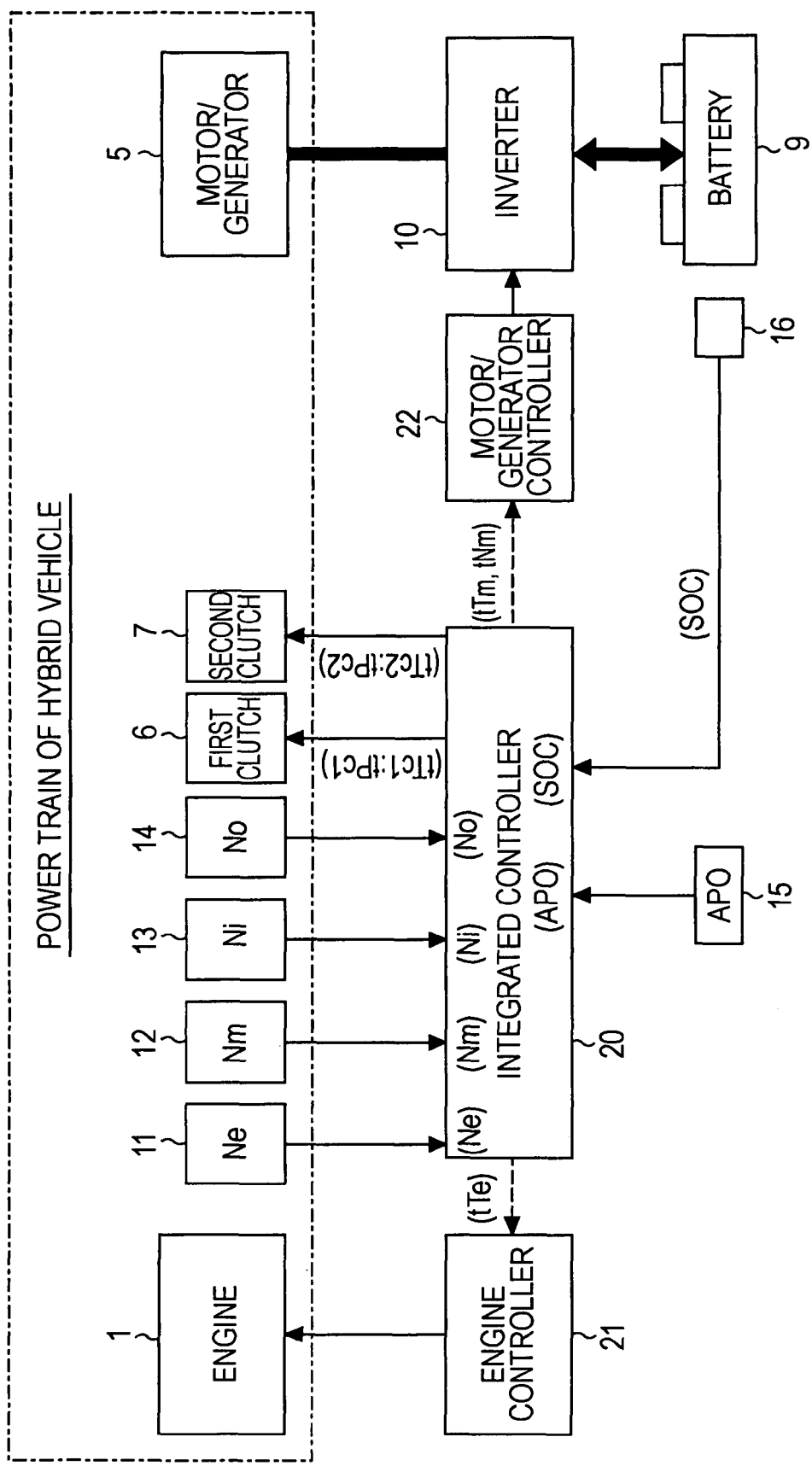
FIG. 6 is a block diagram of a controlling system of the power train shown in FIG. 3.

The engine 1, the motor-generator 5, the first clutch 6 and the second clutch 7 of the power trains of the hybrid vehicles shown in FIGS. 1 to 3 are controlled by a system shown in FIG. 6. In the description below, the power train shown in FIG. 3 (in which a transmission friction element that already exists in the automatic transmission 3 is the second clutch 7) is used.

The controlling system shown in FIG. 6 includes an integrated controller 20 that performs integration control of operation points of the power train. Each controller described herein, including the integrated controller 20, generally consists of a microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed hereinafter. The functions of the integrated controller 20 described herein could be, for example, implemented in software as the executable programs, or could be implemented in whole or in part by separate hardware in the form of one or more integrated circuits (IC).

The operation points of the power train are defined by a target engine torque tTe, a target motor-generator torque tTm (or a target motor-generator rotational speed tNm), a target torque transfer capacity tTc1 (a first clutch command pressure tPc1) of the first clutch 6 and a target torque transfer capacity tTc2 (a second clutch command pressure tPc2) of the second clutch 7. To determine the operation points, several signals are input to the integrated controller 20. Namely, they are a signal from an engine rotation sensor 11 that detects an engine rotational speed Ne, a signal from a motor-generator rotation sensor 12 that detects a motor-generator rotational speed Nm, a signal from an input rotation sensor 13 that detects a transmission input rotational speed Ni, a signal from an output rotation sensor 14 that detects a transmission output rotational speed No, a signal from an accelerator opening sensor 15 that detects an accelerator pedal depression amount (accelerator opening APO) that indicates a requested load of the engine 1 and a signal from a storage state sensor 16 that detects a state of charge SOC (or electrical power that can be taken out) of a battery 9 that stores electrical power for the motor-generator 5.

Among these sensors, the engine rotation sensor 11, the motor-generator rotation sensor 12, the input rotation sensor 13 and the output rotation sensor 14 may be disposed as shown in FIGS. 1 to 3.

From the accelerator opening APO, the battery state of charge SOC and the transmission output rotational speed No (vehicle speed VSP), the integrated controller 20 selects a drive mode (EV mode or HEV mode) that can realize driving force of the vehicle that is desired by a driver. In addition, the integrated controller 20 calculates the target engine torque tTe, the target motor-generator torque tTM (or the target motor-generator rotational speed tNm), the target first clutch torque transfer capacity tTc1 (first clutch command pressure tPc1) and the target second clutch torque transfer capacity tTc2 (second clutch command pressure tPc2).

The target engine torque tTe is supplied to an engine controller 21, and the target motor-generator torque tTm (or target motor-generator rotational speed tNm) is supplied to a motor-generator controller 22. The engine controller 21 controls the engine 1 so that an engine torque Te becomes equal to the target engine torque tTe. The motor-generator controller 22 controls the motor-generator 5 through the battery 9 and an inverter 10 so that a torque Tm (or rotational speed Nm) of the motor-generator 5 becomes equal to the target motor-generator torque tTm (or target motor-generator rotational speed tNm).

The integrated controller 20 supplies solenoid electrical currents, which are in accordance with the target first clutch torque transfer capacity tTc1 (first clutch command pressure tPc1) and the target second clutch torque transfer capacity tTc2 (second clutch command pressure tPc2), to hydraulic control solenoids (not shown) of the first clutch 6 and the second clutch 7. The solenoid electrical currents are supplied to control engagement strengths of the respective first clutch 6 and the second clutch 7 so that a torque transfer capacity Tc1 (first clutch pressure Pc1) of the first clutch 6 becomes equal to the target torque transfer capacity tTc1 (first clutch command pressure tPc1) and a torque transfer capacity Tc2 (second clutch pressure Pc2) of the second clutch 7 becomes equal to the target second clutch torque transfer capacity tTc2 (second clutch command pressure tPc2).

Figure 7:
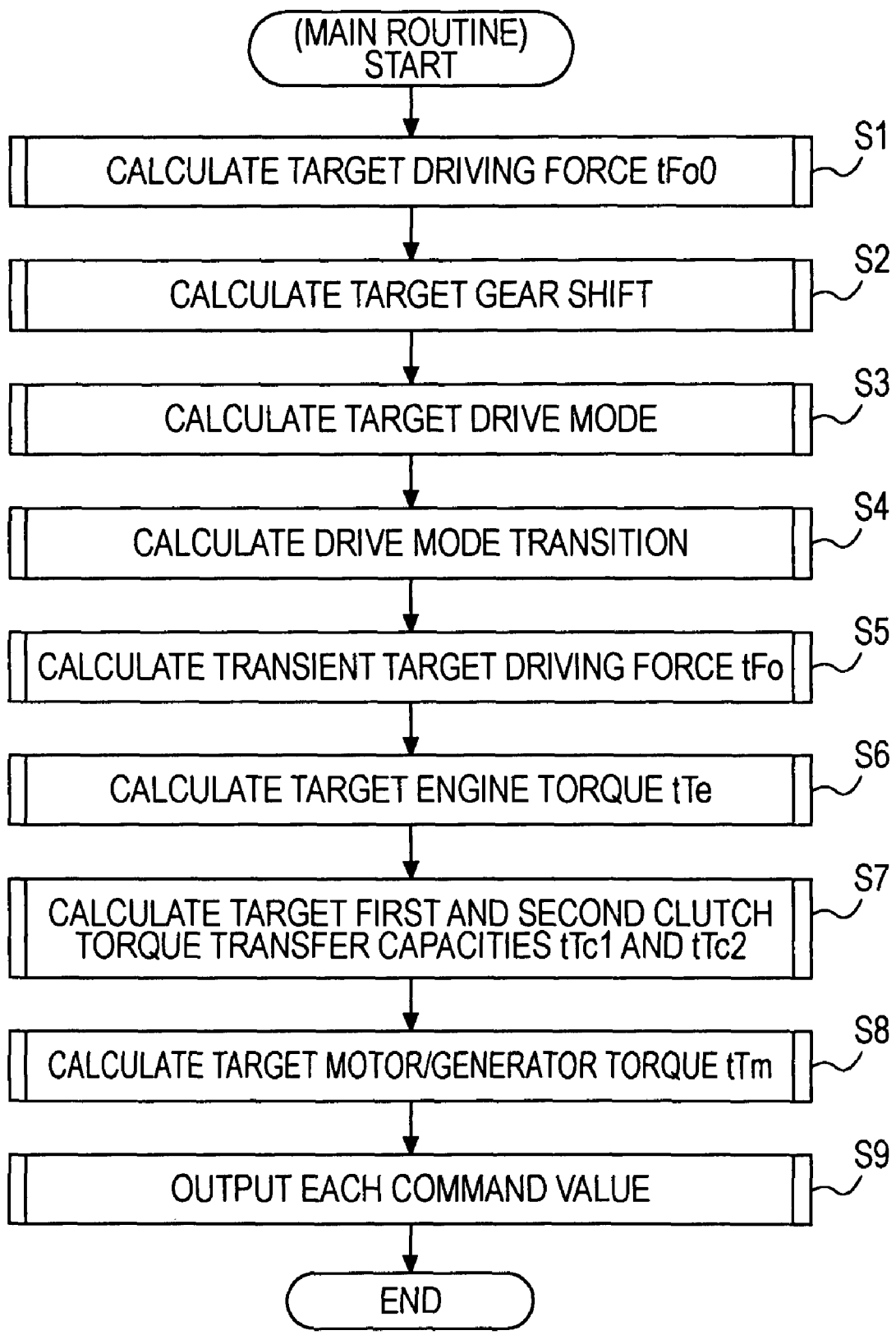
FIG. 7 is a flowchart showing a program of a basic driving force controlling operation that is executed by an integrated controller in the controlling system.

By a main routine illustrated in FIG. 7, the integrated controller 20 selects the drive mode (EV mode or HEV mode) and calculates the target engine torque tTe, the target motor-generator torque tTm (or the target motor-generator rotational speed tNm), the target first clutch torque transfer capacity tTc1 (first clutch command pressure tPc1) and the target second clutch torque transfer capacity tTc2 (second clutch command pressure tPc2).

First, in step S1, using a scheduled target driving force map, a steady target driving force tFo0 is calculated from the accelerator opening APO and the vehicle speed VSP.

In step S2, a target gear SHIFT is next determined from the accelerator opening APO and the vehicle speed VSP based on a scheduled gear shift map. Then, in step S9, a command of the determination is given to a gear-shift controlling unit (not shown) of the automatic transmission 3 to shift the gear of the automatic transmission 3 to the target gear SHIFT.

In step S3, using a scheduled target drive mode area map, a target drive mode (EV mode or HEV mode) is determined from the accelerator opening APO and the vehicle speed VSP.

The target drive mode area map is ordinarily determined so that, usually, the target drive mode is the HEV mode when the load is high (e.g., the accelerator opening is large) and the speed is high, and the target drive mode is the EV mode when the load and speed are low.

A drive mode transition is calculated as follows by comparing a current drive mode and the target drive mode with each other in the next step S4.

If the current drive mode and the target drive mode are the same, a command is given to maintain the current drive mode (EV mode or HEV mode). If the current drive mode is the EV mode, and the target drive mode is the HEV mode, a command is given to perform mode switching from the EV mode to the HEV mode. If the current drive mode is the HEV mode, and the target drive mode is the EV mode, a command is given to perform mode switching from the HEV mode to the EV mode.

Then, the appropriate command is output in step S9 to maintain or switch the mode in accordance with the command.

In step S5, a transient target driving force tFo of each time, which is required for converting with a predetermined response to the target driving force tFo0 obtained in step S1, is calculated from a current driving force.

In calculating the transient target driving force tFo, for example, an output that is obtained as a result of passing the target driving force tFo0 through a low-pass filter with a predetermined time constant may be used as the transient target driving force tFo.

In step S6, in accordance with the drive mode (EV mode or HEV mode) or the mode switching, the target engine torque tTe that is required for achieving the transient target driving force tFo with or without the cooperation of the motor-generator 5 is determined from the transient target driving force tFo, a tire effective radius Rt of each driving wheel 2, a final gear ratio if, a gear ratio iG of the automatic transmission 3 determined by a currently selected gear, the input rotational speed Ni of the automatic transmission 3, the engine rotational speed Ne and a target discharge power tP in accordance with the battery state of charge SOC (or electrical power that can be taken out).

In step S9, a command regarding the target engine torque tTe that has been determined in this way is given to the engine controller 21 shown in FIG. 6 to cause the engine controller 21 to control the engine 1 so that the target engine torque tTe is achieved.

In step S7, the target torque transfer capacity tTc1 (clutch command pressure tPc1) of the first clutch 6 and the target torque transfer capacity tTc2 (clutch command pressure tPc2) of the second clutch 7, required for executing the mode switching or required for achieving the transient target driving force tFo, are determined in accordance with the drive mode (EV mode or HEV mode) or the mode switching.

In step S9, commands regarding the target torque transfer capacity tTc1 (clutch command pressure tPc1) of the first clutch 6 and the target torque transfer capacity tTc2 (clutch command pressure tPc2) of the second clutch 7 that have been determined in this way are given to the first clutch 6 and the second clutch 7 shown in FIG. 6 to control the engagement strengths of the first clutch 6 and the second clutch 7 so that the target transfer torque capacities tTc1 and tTc2 are achieved.

In step S8, in accordance with the drive mode (EV mode or HEV mode) or the mode switching, the target motor-generator torque tTm that is required for achieving the transient target driving force tFo with or without the cooperation of the engine 1 is determined from the transient target driving force tFo, the tire effective radius Rt of each driving wheel 2, the final gear ratio if, the gear ratio iG of the automatic transmission 3 determined by the currently selected gear, the input rotational speed Ni of the automatic transmission 3, the engine rotational speed Ne and the target discharge power tP in accordance with the battery state of charge SOC (or electrical power that can be taken out).

In step S9, a command regarding the target motor-generator torque tTm that has been determined in this way is given to the motor-generator controller 22 shown in FIG. 6 to cause the motor-generator controller 22 to control the motor-generator 5 so that the target motor-generator torque tTm is achieved.

The foregoing gives a description of a general controlling operation of driving force of a power train of a hybrid vehicle. Embodiments of the invention that perform an HEV-to-EV-mode switching controlling operation are next described for a case in which, as illustrated in FIG. 8, the accelerator opening APO is reduced due to the driver taking his/her foot off an accelerator pedal, so that a command for mode switching from the HEV mode to the EV mode is generated and upshifting of the automatic transmission 3 from the fourth speed to the fifth speed is performed.

In the HEV-to-EV-mode switching as described above, the hybrid drive (HEV) mode in which the first clutch 6 and the second clutch 7 are engaged for driving the wheels 2 by the power from the engine 1 and the motor-generator 5 is switched to the electric drive (EV) mode in which the first clutch 6 is disengaged and the engine 1 is stopped for driving the wheels 2 only by the power from the motor-generator 5. Accordingly, the HEV-to-EV-mode switching is performed by disengaging the first clutch 6 and stopping the engine 1.

The upshifting from the fourth speed to the fifth speed of the automatic transmission 3 is, as indicated by arrows in the engagement logic diagram of FIG. 5, achieved by disengaging the engaged direct clutch D/C (called "disengagement element") and engaging the disengaged front brake Fr/B (called "engagement element"). Accordingly, here, the direct clutch D/C (disengagement element) is used as the second clutch 7 shown in FIG. 3, and its command pressure is represented by tPc2 and its actual pressure is represented by Pc2.

In addition, in FIG. 8, a command pressure of the front brake Fr/B (engagement element) is represented by tPc, its actual pressure is represented by Pc, and its torque transfer capacity is represented by Tc. FIG. 8 also shows that a torque transfer capacity of the high-and-low reverse clutch H&LR/C, which remains engaged during the upshifting from the fourth speed to the fifth speed as is clear from FIG. 5, is given along with the torque Te of the engine 1, the torque Tm of the motor-generator 5, the engine rotational speed Ne, the motor-generator rotational speed Nm and a transmission output torque To.

Still further, in FIG. 8 the command pressure of the first clutch 6 shown in FIG. 3 is represented by tPc1, its actual pressure is represented by Pc1 and its torque transfer capacity is represented by Tc1.

However, the first clutch 6 is engaged so that its torque transfer capacity Tc1 is at its maximum value in its ordinary state, and its torque transfer capacity Tc1 is reduced as the actual pressure Pc1, which is controlled so as to approach the command pressure tPc1, increases.

At a moment t1 in which a fourth-to-fifth-speed upshift command is generated due to a reduction in the accelerator opening APO (requested driving force) shown in FIG. 8, the command pressure tPc2 of the direct clutch D/C (disengagement element) used as the second clutch 7 at this time is theoretically immediately set to 0 although there is a slight response delay. This causes the actual pressure Pc2 of the direct clutch D/C (disengagement element) to be controlled so as to follow the command pressure tPc2 by a delay in operation of hardware, so that the direct clutch D/C (disengagement element) is disengaged as soon as possible from the moment t1.

In contrast, the engagement of the front brake Fr/B (engagement element) is not yet executed, so that the automatic transmission 3 is set in a neutral state in which power cannot be transmitted.

A further reduction in the accelerator opening APO (requested driving force) shown in FIG. 8 causes an HEV-to-EV-mode switching command to be generated at a moment t2 so that, at a moment t3, a determination is made that the accelerator opening APO=0 (idling state). At a moment t4 reached when a predetermined time TM1 elapses from the moment t2, the command pressure tPc1 of the first clutch 6 is theoretically immediately set at its maximum value although there is a slight delay in response.

As a result, the actual pressure Pc1 of the first clutch 6 is controlled so as to follow the command pressure tPc1 by a delay in operation of hardware, and the torque transfer capacity Tc1 of the first clutch 6 is reduced as shown in FIG. 8 so that an illustrated slip start point is passed, and the first clutch 6 is finally disengaged.

From a moment t5 reached when a predetermined time TM2 elapses from the moment t2, the engine torque Te that has been controlled in accordance with the accelerator opening APO up to this time is reduced at an instant by stopping the engine by a fuel cut (fuel supply stoppage), so that the engine is stopped as indicated by a change in the engine rotational speed Ne with time.

The predetermined times TM1 and TM2 are scheduled times that are mutually related to each other so that the first clutch 6 is disengaged after the engine torque Te set when operating the engine is lost by stopping the engine 1 (that is, when a positive engine torque is lost in FIG. 8). (In FIG. 8, a moment t6 when it is determined that the first clutch 6 is disengaged and a moment t7 when the first clutch 6 is disengaged are shown.)

From the moment t5 reached when the predetermined time TM2 elapses from the moment t2, that is, concurrently with the stopping of the engine performed as mentioned above from the moment t5, a rotation matching controlling operation, which is performed for preventing a gear-shifting shock and which previously causes a reduction in an input rotational speed (occurring when upshifting from the fourth speed to the fifth speed of the automatic transmission 3 by the motor-generator 5) is carried out.

The rotation matching controlling operation is for controlling the rotational speed (Nm) of the motor-generator 5. More specifically, this operation is for reducing the rotational speed Nm of the motor-generator 5 from a prior-to-gear-shifting rotational speed (fourth-gear rotational speed in FIG. 8) to an after-gear-shifting rotational speed (fifth-gear rotational speed in FIG. 8) within a moment t8 from the moment t5 when the rotation matching controlling operation is started. The moment t8 is reached when a target gear-shifting time (see FIG. 8), previously set for preventing gear-shifting shock, elapses from the moment t5. The controlling operation is ended at the moment t8 when the rotational speed Nm has approached the after-gear-shifting rotational speed (fifth-speed rotational speed in FIG. 8) with a margin.

The command pressure tPc of the front brake Fr/B (which is an engagement element when upshifting from fourth speed to fifth speed) increases as illustrated from the engine stoppage command issuing moment (motor-generator 5 rotation matching control starting moment) t5. Up to the moment t8 when the motor-generator 5 rotation matching controlling operation is ended, the actual pressure Pc is set to a small value that allows the front brake Fr/B (engagement element) to undergo a loss of stroke against a return spring. This causes the front brake Fr/B (engagement element) to be maintained in a state corresponding to that immediately before starting the engagement so that a delay in the engagement can be minimized.

At the moment t8 when the motor-generator 5 rotation matching controlling operation is ended, the command pressure tPc of the front brake Fr/B (engagement element) is set at a maximum, and the actual pressure Pc that is controlled so as to follow the command pressure tPc by a delay in operation of hardware is increased to increase the torque transfer capacity Tc of the front brake Fr/B as shown in FIG. 8.

The engagement of the front brake Fr/B (engagement element) as a result of this and the disengagement of the direct clutch D/C (disengagement element) cause the upshifting of the automatic transmission 3 from the fourth speed to the fifth speed.

The progress of such engagement of the front brake Fr/B (engagement element), that is, the progress of upshifting from the fourth speed to the fifth speed, causes friction torque of the motor-generator 5 to be reduced as is clear from a change in the motor torque Tm with time. However, from a moment t9 reached when a predetermined time TM3 elapses from the moment t8 when the motor-generator 5 rotation matching controlling operation is ended, a motor torque controlling operation for setting the torque Tm of the motor-generator 5 to a target driving torque obtained after the mode switching from the HEV mode to the EV mode is carried out.

Here, the predetermined time TM3 is a scheduled time that is previously set as a time required for a friction torque Tm of the motor-generator 5 to disappear with the progress of the engagement of the front brake Fr/B (engagement element), that is, the progress of the upshifting from the fourth speed to the fifth speed.

At a moment t10 when the torque Tm of the motor/generator 5 becomes equal to the target driving torque obtained after the mode switching from the HEV mode to the EV mode, by such motor torque controlling operation, the mode switching from the HEV mode to the EV mode involving the upshifting of the automatic transmission 3 from the fourth speed to the fifth speed ends. Since the target driving torque obtained after the mode switching from the HEV mode to the EV mode is a negative value due to the accelerator opening APO being equal to 0 resulting from the driver taking his/her foot off the accelerator pedal, from the moment t9 onwards the motor-generator 5 functions as a generator that generates power by energy regeneration.

As shown in FIG. 8, the torque transfer capacity of the high-and-low reverse clutch H&LR/C, which remains engaged during the upshifting of the automatic transmission 3 from the fourth speed to the fifth speed (as shown in FIG. 5), is controlled as follows depending on whether the moment is before or after the moment t10 when the mode switching from the HEV mode to the EV mode is ended and when the torque Tm of the motor-generator 5 becomes equal to the target driving torque obtained after this mode switching. Before the moment t10, the torque transfer capacity of the high-and-low reverse clutch H&LR/C is controlled to a torque capacity that allows torque to be transmitted from the engine 1 and the motor-generator 5 in accordance with the HEV mode. In contrast, after the moment t10, the torque transfer capacity of the high-and-low reverse clutch H&LR/C is controlled to a torque capacity that allows torque to be transmitted from the motor-generator 5 in accordance with the EV mode.

The HEV-to-EV-mode switching controlling operation according to the above-described embodiment provides the following operational advantages.

When mode switching from the HEV mode to the EV mode by stopping the engine 1 and disengaging the first clutch 6, the engine 1 is stopped and the first clutch 6 is disengaged during the mode switching while a transfer torque capacity (determined by the actual pressure Pc2 in FIG. 8) of the second clutch 7 (direct clutch D/C) is reduced so that the second clutch 7 can absorb shock produced when the engine is stopped (or there is a change in the engine torque Te shown by cross-hatching in FIG. 8), that is, while the torque transfer capacity of the direct clutch D/C is set to 0 in FIG. 8. Therefore, even if the engine 1 is stopped while the torque transfer capacity Tc1 of the first clutch 6 is greater than the engine torque Te due to the disengagement timing of the first clutch 6 being delayed in relation to the timing of stoppage of the engine 1 as a result of variations in the disengagement timing, torque variation (that is, change in the engine torque Te shown by cross-hatching in FIG. 8) occurring when the engine is stopped is absorbed by a slip of the second clutch 7 (direct clutch D/C) that is disposed in a path through which the torque variation occurring when the engine is stopped is transmitted towards the rear driving wheels through the first clutch 6. Therefore, as is clear from the change in the output torque To, which is maintained at 0 in FIG. 8, with time it is possible to prevent the generation of shock caused by stopping the engine so that the related problems concerning such shock can be overcome.

By preventing the generation of shock when the engine is stopped in this way, it is no longer necessary to perform a torque compensation controlling operation of the motor-generator 5 for solving the problem that shock is generated when the engine is stopped. Therefore, it is possible to reliably prevent the generation of shock caused by stopping the engine without having to determine a torque compensation amount and a torque compensation timing to be determined when carrying out the torque compensation controlling operation.

In the case in which the torque compensation controlling operation of the motor-generator 5 needs to be carried out, when the mode switching from the HEV mode to the EV mode involves gear shifting of the automatic transmission (and, thus, when it is necessary to carry out the rotation matching controlling operation of the motor-generator for preventing generation of shock caused by the gear shifting), the rotation matching controlling operation must be carried out while carrying out the torque compensation controlling operation of the motor-generator.

However, it is not possible to carry out these controlling operations at the same time, as a result of which they are carried out successively starting from the one having a higher order of priority. This gives rise to a different problem of a mode switching response being considerably reduced.

In contrast, in the embodiment, as mentioned above, since the generation of shock caused by stopping the engine is achieved without carrying out the torque compensation controlling operation of the motor-generator 5, the rotation matching controlling operation of the motor-generator 5 for preventing generation of shock caused by the gear shifting only needs to be carried out. As a result, the mentioned different problem does not arise, and the performance of the rotation matching controlling operation of the motor-generator 5 for preventing the generation of shock caused by the gear shifting can be enhanced.

When the torque transfer capacity of the first clutch 6 is less than the engine torque Te while a positive driving torque is being generated when the engine being subjected to the engine stoppage operation (fuel cut in the embodiment) is not yet stopped due to the disengagement timing of the first clutch 6 being faster than the engine 1 stoppage timing due to variations in the disengagement timing, the positive driving torque causes fore blowing at the engine. This causes the driver to experience an uncomfortable feeling. In contrast, in the embodiment as mentioned above, since the problems other than the problem related to fore blowing at the engine are all solved, the various problems of known systems described above can be solved by executing as illustrated in FIG. 8 the mode switching from the HEV mode to the EV mode so that the fore blowing at the engine does not occur. Therefore, it is possible to overcome all of the problems by simple controlling operations.

In the embodiment, the rotation matching controlling operation of the motor-generator 5 for preventing the generation of shock caused by gear shifting when upshifting from the fourth speed to the fifth speed is carried out while the torque transfer capacity (determined by the actual pressure Pc2 in FIG. 8) of the second clutch 7 (direct clutch D/C) is reduced so that the second clutch 7 can absorb shock that is produced when the engine is stopped (or a change in the engine torque Te shown by cross-hatching in FIG. 8 occurs), that is, while the torque transfer capacity of the direct clutch D/C is set to 0 in FIG. 8. Therefore, it is possible to carry out the rotation matching controlling operation of the motor-generator 5 independently of the output torque To and the motor-generator torque Tm. Consequently, the engine stoppage operation (mode switching) and the rotation matching controlling operation (gear shifting controlling operation) can be carried out concurrently. Accordingly, the mode switching from the HEV mode to the EV mode involving gear shifting of the automatic transmission 3 can be accomplished in a short time.

Further, the first clutch 6 is disengaged after the engine torque Te set during the operation of the engine disappears by stopping the engine 1 based on the elapsed times (predetermined times TM2 and TM1) measured from the moment t2 when an HEV-to-EV-mode switching command is issued. Therefore, the torque transfer capacity of the first clutch 6 does not become less than the engine torque Te while a positive driving torque is being generated when the engine 1 being subjected to the engine stoppage operation (fuel cut in the embodiment) is not yet stopped. Therefore, it is possible to reliably overcome the problem that the driver experiences an uncomfortable feeling due to fore blowing at the engine caused by the positive driving torque.

In the foregoing description, as is clear from the engagement logic diagram of FIG. 5, the upshifting of the automatic transmission 3 from the fourth speed to the fifth speed is carried out without a one-way clutch. Accordingly, the fore blowing at the engine is prevented from occurring by disengaging the first clutch 6 after the engine torque Te set during the operation of the engine disappears by stopping the engine 1 based on the elapsed times (predetermined times TM2 and TM1) that are measured from the moment t2.

When a one-way clutch (reverse driving inhibiting element) that inhibits reverse driving from the driving wheels 2 to the engine 1 by slipping exists at a transmission system that is provided by engagement of transmission friction elements when gear shifting, and the element slips, fore blowing at the engine does not occur. Therefore, it is desirable that the stopping of the engine and the disengagement of the first clutch be started immediately at the moment t2, so that the response of the mode switching and the fuel consumption of the engine are improved.

In the foregoing description, the upshifting of the automatic transmission 3 from the fourth speed to the fifth speed is carried out by engaging/disengaging friction elements as shown in FIG. 5, including disengagement of the engaged direct clutch D/C and the engagement of the disengaged high-and-low reverse clutch H&LR/C. Accordingly, the direct clutch D/C, which is a disengagement transmission friction element, is used as the second clutch 7 (see FIG. 3), so that the second clutch 7 does not need to be newly provided as it is in FIGS. 1 and 2. Therefore, this structure is advantageous from the viewpoints of cost and space.

When mode switching from the HEV mode to the EV mode involving gear shifting of the automatic transmission 3 that does not depend upon the engagement/disengagement of the friction elements or mode switching from the HEV mode to the EV mode not involving gear shifting, the transmission friction element for maintaining the transmission state of the automatic transmission is used as the second clutch 7 in FIG. 3 during the mode switching. Accordingly, similar operational advantages can be provided without having to newly provide the second clutch 7 as in FIGS. 1 and 2.

For example, as is clear from FIG. 5 illustrating the engagement logic of the automatic transmission 3, since the high-and-low reverse clutch H&LR/C is engaged in all of the shift gears except the second speed, the high-and-low reverse clutch H&LR/C is used as the second clutch in FIG. 3 and is disengaged when mode switching from the HEV mode to the EV mode or when its torque transfer capacity is reduced to make it possible to achieve the above-mentioned operational advantages.

Also, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A controlling device for a hybrid vehicle, comprising:
   an engine;
   a motor-generator;
   a first clutch whose torque transfer capacity is changeable between the engine and the motor-generator;
   a second clutch whose torque transfer capacity is changeable between the motor-generator and a driving wheel; and
   a controller configured to:
      control a selection between an electric drive mode, in which the hybrid vehicle travels by using the motor-generator while the first clutch is disengaged and the second clutch is engaged, and a hybrid drive mode, in which the hybrid vehicle travels by at least driving force of the engine while the first clutch and the second clutch are engaged;
      perform mode switching from the hybrid drive mode to the electric drive mode by reducing the torque transfer capacity of the second clutch, then initiating a stop of the engine, and then disengaging the first clutch; and
      disengage the first clutch after an engine torque set during operation of the engine reaches substantially zero as a result of completing the stop of the engine, based on an elapsed time measured from a moment when a mode switching command for switching from the hybrid drive mode to the electric drive mode is issued.

2. The controlling device according to claim 1, further comprising:
   an automatic transmission disposed between the motor-generator and the driving wheel.

3. The controlling device according to claim 2 wherein the second clutch is a transmission friction element for maintaining the automatic transmission in a power transmission state.

4. The controlling device according to claim 3, further comprising:
   a reverse driving inhibiting element disposed at the transmission system that inhibits reverse driving from the driving wheel to the engine by slipping a disengaged transmission friction element during engagement of the disengaged transmission friction element, wherein the engine is stopped and the first clutch is disengaged immediately at a moment when a mode switching command for switching from the hybrid drive mode to the electric drive mode is issued.

5. The controlling device according to claim 4 wherein the reverse driving inhibiting element is a one-way clutch.

6. The controlling device according to claim 2, further comprising:
   an engaged transmission friction element of the automatic transmission; and
   a disengaged transmission friction element of the automatic transmission; and wherein the controller is further operable to:
      disengage the engaged transmission friction element and engage the disengaged transmission friction element to accomplish gear shifting of the automatic transmission, wherein the engaged transmission friction element that is disengaged is the second clutch; and
      perform the mode switching at the time of the gear shifting of the automatic transmission.

7. The controlling device according to claim 6 wherein the controller is further operable to:
   subject the motor-generator to a rotation matching controlling operation so that an input-side rotational speed of the automatic transmission approaches a rotational speed set after the gear shifting, while the second clutch is in a slipping condition or is disengaged.

8. The controlling device according to claim 1 wherein the controller is further configured to perform mode switching from the hybrid drive mode to the electric drive mode by reducing the torque transfer capacity of the second clutch and then by disengaging the first clutch during reduction of while reducing the torque transfer capacity of the second clutch or after reducing the torque transfer capacity of the second clutch.

9. The controlling device according to claim 1, further comprising:
   a shock produced when the engine is stopped, the second clutch operable to absorb the shock.

10. A method for controlling a hybrid vehicle, the hybrid vehicle including an engine, a motor-generator, a first clutch with a torque transfer capacity changeable between the engine and the motor-generator, a second clutch with a torque transfer capacity changeable between the motor-generator, a driving wheel, and an automatic transmission disposed between the motor-generator and the driving wheel, the method comprising:
controlling a selection between an electric drive mode, in which the hybrid vehicle travels by using the motor-generator while the first clutch is disengaged and the second clutch is engaged, and a hybrid drive mode, in which the hybrid vehicle travels by at least driving force of the engine while the first clutch and the second clutch are engaged;
performing mode switching from the hybrid drive mode to the electric drive mode by reducing the torque transfer capacity of the second clutch, then initiating a stop of the engine, and then disengaging the first clutch; and
wherein performing the mode switching further includes gear shifting the automatic transmission by disengaging a first transmission friction element of the automatic transmission and engaging a second transmission element of the automatic transmission, wherein the first transmission friction element is the second clutch.

11. The method according to claim 10, further comprising:
disengaging the first clutch after an engine torque set during operation of the engine reaches substantially zero as a result of completing the stop of the engine, based on an elapsed time measured from a moment when a mode switching command for switching from the hybrid drive mode to the electric drive mode is issued.

12. The method according to claim 11, the method further comprising:
engaging a disengaged transmission friction element and inhibiting reverse driving from the driving wheel to the engine by, wherein the engine is stopped and the first clutch is disengaged immediately at a moment when a mode switching command for switching from the hybrid drive mode to the electric drive mode is issued.

13. The method according to claim 10, the method further comprising:
maintaining the automatic transmission in a power transmission state using the second clutch.

14. The method according to claim 10, further comprising:
engaging the first transmission friction element of the automatic transmission; and
disengaging the second transmission friction element of the automatic transmission.

15. The method according to claim 10, further comprising:
subjecting the motor-generator to a rotation matching controlling operation, so that an input-side rotational speed of the automatic transmission approaches a rotational speed set after the gear shifting, while the torque transfer capacity of the second clutch is low.

16. The method according to claim 10, further comprising:
absorbing a shock produced when the engine is stopped using the second clutch.

* * * * *